United States Patent [19]

Malone

[11] Patent Number: 4,533,856
[45] Date of Patent: Aug. 6, 1985

[54] SUBMERGED SCRAPER CONVEYOR AUTOMATIC SPEED CONTROL

[75] Inventor: Dennis M. Malone, West Granby, Conn.

[73] Assignee: Combustion Engineering, Inc., Windsor, Conn.

[21] Appl. No.: 485,919

[22] Filed: Apr. 18, 1983

[51] Int. Cl.³ .............................................. F23H 11/24
[52] U.S. Cl. ........................................ 318/6; 318/301; 110/330; 209/923
[58] Field of Search ........................ 318/6, 7, 301, 302, 318/311, 333, 312, 610; 340/506, 511; 110/329, 330; 226/25, 26, 30, 31, 45; 209/910, 922, 923; 242/75, 75.3, 75.42, 75.43, 75.44, 75.51, 147 R

[56] References Cited

U.S. PATENT DOCUMENTS

| | | | |
|---|---|---|---|
| 3,188,841 | 6/1965 | Wallace | 318/7 |
| 3,221,237 | 11/1965 | Kalenian | 318/347 |
| 3,318,547 | 5/1967 | Bejach | 242/75.3 X |
| 3,348,107 | 10/1967 | Hamby | 242/75.51 X |
| 3,671,953 | 6/1972 | Goldberg | 340/511 |
| 3,734,426 | 5/1973 | Howes et al. | 318/7 X |
| 3,886,417 | 5/1975 | Niwa | 318/7 |
| 4,008,386 | 2/1977 | Ross | 318/610 X |
| 4,126,817 | 11/1978 | Luzio | 318/6 X |
| 4,347,993 | 9/1982 | Leonard | 242/75.44 X |
| 4,358,821 | 11/1982 | Niemi | 318/610 X |

Primary Examiner—William M. Shoop, Jr.
Assistant Examiner—Bentsu Ro
Attorney, Agent, or Firm—David L. Smith

[57] ABSTRACT

In a submerged scraper conveyor (10), an automatic voltage control system controls the speed of variable speed drive (32), in turn the speed of follower sprocket (22) and in turn the speed of drag chain (16) as a function of the torque on the headshaft (21). The tension on endless roller chain (36) is monitored by load cell (40) as indicative of the torque on the headshaft (21) and a standard process control signal is generated therefrom. The speed of variable speed drive (32) is varied as a function of the measured torque between a lower speed drive limit and an upper speed drive limit.

10 Claims, 2 Drawing Figures

SUBMERGED SCRAPER CONVEYOR AUTOMATIC SPEED CONTROL

BACKGROUND OF THE INVENTION

This invention relates to a bottom ash submerged scraper conveyor and in particular to a method and apparatus for automatically controlling the speed of a bottom ash submerged scraper conveyor drag chain as a function of the ash loading thereon.

A bottom ash submerged scraper conveyor is used for the continuous removal of ash from a water impounded trough located beneath a furnace. The submerged scraper conveyor is operated continuously because the water impounded trough has relatively little storage capacity when compared to a conventional water impounded hopper beneath a furnace. The ash which falls from the furnace is quenched by the water and settles to the bottom of the trough. The submerged scraper conveyor drag chain consists of flights located between two parallel lengths of chain that scrape along the lower surface of the water impounded trough and transport the settled ash to and up the dewatering slope at the end of the submerged scraper conveyor. At the top of the dewatering slope, the drag chain passes around a sprocket, reversing direction and dumping the conveyed ash into a discharge. The drag chain returns through a compartment beneath the water impounded trough to the opposite end of the scraper conveyor. Again the drag chain passes around a sprocket reversing direction to repeat the cycle of passing through the water impounded trough and transporting ash to and up the dewatering slope.

The drive unit for the submerged scraper conveyor rotates a headshaft at the top of the dewatering slope where the flights and chain pass around a sprocket reversing direction. The drive unit may be any appropriate variable speed drive including a hydraulic drive or a variable speed electric motor. The speed at which the submerged scraper conveyor drag chain and flights travel ranges from two feet per minute to eighteen feet per minute with the normal speed less then ten feet per minute to reduce wear and power consumption. The speed of the submerged scraper conveyor drag chain, although adjustable, has been achieved by manually selecting an appropriate speed and setting the drive unit to achieve the selected speed. The selected speed would necessarily have to be great enough to remove the bottom ash generated under the worst conditions anticipated until the selected speed setting was subsequently reset. Since the submerged scraper conveyor wears while in operation, even if unloaded, the submerged scraper conveyor would operate unnecessarily fast causing needless wear.

Therefore a need exists for an automatic speed control for a submerged scraper conveyor. It is an object of the present invention to provide an automatic speed control for a submerged scraper conveyor that would sense the required ash removal capacity of the submerged scraper conveyor and adjust the speed of the submerged scraper conveyor drag chain in response to the required ash removal capacity. The automatic speed control would sense the torque on the headshaft and adjust the speed of the submerged scraper conveyor drag chain so that the torque on the headshaft is controlled to the design value. Maintaining the design torque on the headshaft assures that the capacity of the submerged scraper conveyor to remove bottom ash is commensurate with the rate at which the bottom ash is generated. In this manner, automatic speed control of the submerged scraper conveyor drag chain maintains the availability of the required bottom ash removal capacity for all furnace operating conditions.

SUMMARY OF THE INVENTION

The present invention overcomes the disadvantage of manually selecting an appropriate speed in the prior art by eliminating the manual setting of submerged scraper conveyor speed. In accordance with the present invention, the tension on the drive chain which in turn drives the submerged scraper conveyor drag chain is monitored as indicative of the torque on the headshaft. A signal proportional to the tension in the drive chain is generated and used to control the speed of the submerged scraper conveyor drag chain as a function of the amount of ash currently being removed from the water impounded trough. The speed varies from a minimum of approximately two feet per minute to a maximum of approximately eighteen feet per minute thereby maintaining ash removal commensurate with the rate at which bottom ash is produced while simultaneously reducing wear and concomitantly extending the life of the drag chain, flights and wear plates.

The variable speed thereby achieved provides reduced power consumption when compared to the manually set speed control. The automatic speed control also permits minimized speed operation for current operating conditions thereby minimizing component wear. Furthermore, the automatic speed control obviates the need for an operator to select the speed at which the submerged scraper conveyor will operate.

DESCRIPTION OF THE PREFERRED EMBODIMENT

Figure 1:
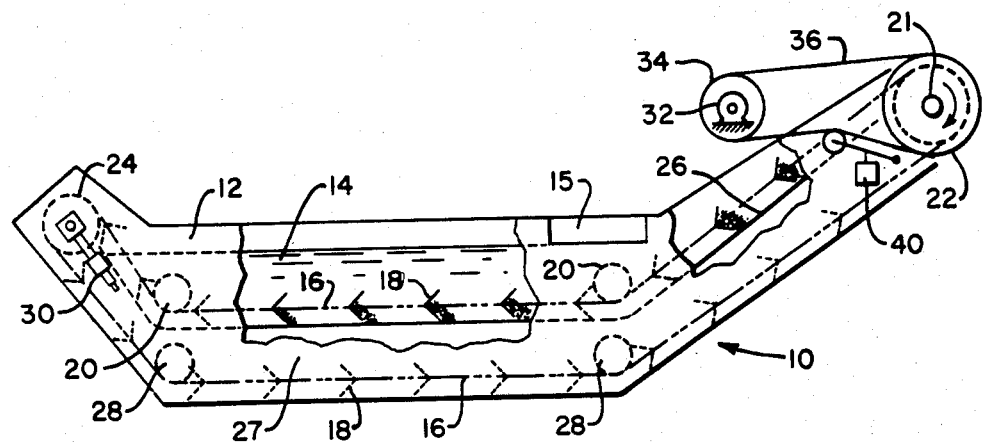
FIG. 1 is a cutaway side view of the submerged scraper conveyor.

Referring to the drawing, there is depicted therein a bottom ash submerged scraper conveyor automatic speed control system in accordance with the present invention as best seen in FIG. 1. Submerged scraper conveyor 10 is an apparatus for the continuous removal of furnace bottom ash. Submerged scraper conveyor 10 receives ash from the furnace (not shown) in upper trough 12. The ash is quenched by water 14 maintained in upper trough 12 to the level of overflow 15. The water maintained in upper trough 12 also provides a seal between the furnace and atmosphere such that the furnace can operate at other than atmospheric pressure. Prior to removal, the ash settles to the bottom of upper trough 12.

Drag chain 16 is comprised of two parallel lengths of link chain with flights 18 between the parallel lengths. As drag chain 16 passes over idler sprockets 20, follower sprocket 22 and reversing roller 24, flights 18 scrape along the lower surface of upper trough 12 and transport settled ash to and up the dewatering slope 26. As ash is conveyed up dewatering slope 26, water drains from the ash back into upper trough 12.

The angle of dewatering slope 26 varies depending upon the physical configuration and space available. As flights 18 reverse direction passing over follower sprocket 22 at the top of dewatering slope 26, the conveyed ash is dumped into the discharge. Drag chain 16 returns through the dry lower trough 27 passing over lower idler sprockets 28 to reversing roller 24 to complete one cycle.

Reversing roller 24 is equipped with takeup adjuster 30 to maintain tension in drag chain 16. Chain lengthening, as a result to wear in the interlink, necessitates takeup adjuster 30.

Submerged scraper conveyor 10 has minimal ash storage capability within upper trough 12 and therefore operates continuously while the furnace is in operation. The submerged scraper conveyor therefore removes ash at the rate at which ash is produced. Operating submerged scraper conveyor 10 at design torque on headshaft 21 minimizes drag chain 16 speed commensurate with the amount of ash being generated.

Figure 2:
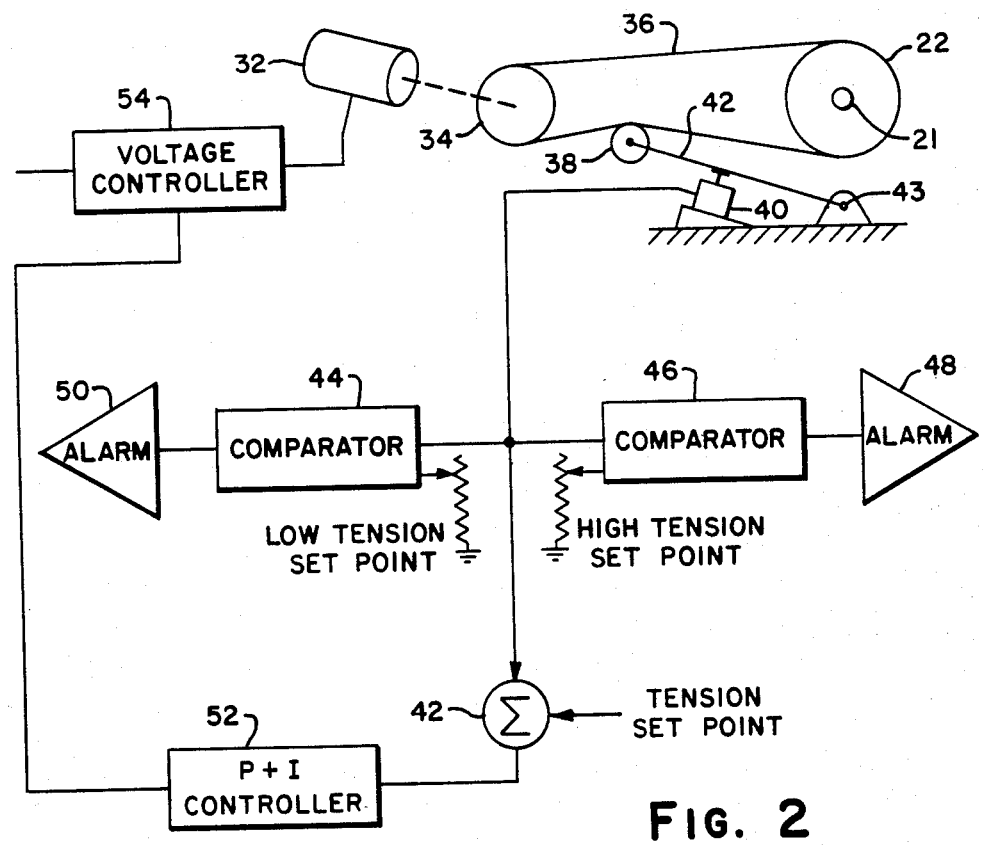
FIG. 2 is a more detailed view of the submerged scraper conveyor drive and control system.

The illustrated embodiment of the submerged scraper conveyor speed control is shown in FIG. 2. The power transmitted to sprocket 34 by variable speed drive 32 is transferred to headshaft 21 on which follower sprocket 22 is mounted by endless roller chain 36. Sprocket 34, headshaft 21 and follower sprocket 22 as shown rotate clockwise. Idler sprocket 38 on the tension side of endless roller chain 36 transmits the tension in endless roller chain 36 to load cell 40 through pivot arm 42 which pivots at pivot 43. Load cell 40 produces a standard process control signal proportional to the torque on headshaft 21 as indicated by the tension in endless roller chain 36. The tension signal is an input to comparators 44 and 46 as well as summer 42. The tension signal is used to control the speed of variable speed drive 32 and in turn control the speed of drag chain 16 as well as alarm abnormal operating conditions.

Comparator 44 compares the tension signal generated by load cell 40 to a predetermined lower tension set point. When the tension signal generated by load cell 40 is less than the tension represented by the predetermined lower tension set point, the torque on head shaft 21 is less than a desirable limit and alarm 50 is activated to indicate insufficient torque.

Comparator 46 compares the tension signal generated by load cell 40 to a predetermined upper tension set point. When the tension signal generated by load cell 40 exceeds the magnitude of tension represented by the predetermined upper tension setpoint, the torque on headshaft 21 has exceeded a desirable limit and alarm 48 is activated to indicate an overload condition.

The tension signal generated by load cell 40 is added to a tension set point in summer 42. The tension set point corresponds to design torque on headshaft 21. Summer 42 generates an error as the difference between the tension signal generated by load cell 40 and the tension set point.

The error generated by summer 42 is the input signal to controller 52. Controller 52, which in the preferred embodiment is a proportional plus integral controller, operates on the error signal and generates as an output the desired drag chain 16 speed signal based on monitored operating torque conditions.

Voltage controller 54 receives the desired speed signal generated by controller 52 and produces as an output a voltage controlled signal to control the speed of variable speed drive 32. In this manner the bottom ash automatic speed control system controls the speed of variable speed drive unit 32, in turn the speed of follower sprocket 22 and in turn the speed of drag chain 16 as a function of the torque on headshaft 21. Voltage controller 54 adjusts the speed of drag chain 16 as a function of the torque on headshaft 21 between a predetermined minimum speed of approximately two feet per minute and a predetermined maximum speed of approximately eighteen feet per minute. When the desired speed signal indicates that voltage controller 54 should decrease the speed of drag chain 16 below the predetermined minimum sped, voltage controller 54 maintains the speed of drag chain 16 at the predetermined minimum speed. Correspondingly, at the upper end of the speed range when the desired speed signal indicates that voltage controller 54 should increase the speed of drag chain 16 above the predetermined maximum speed, voltage controller 54 maintains the speed of drag chain 16 at the predetermined maximum speed.

The filled area between two flights 18 is designed to be approximately 65% full at design torque on headshaft 21. When submerged scraper conveyor 10 is operating with design torque on headshaft 21 and the rate at which ash is generated increases, the ash in the fill area between two flights 18 increases causing an increase in the tension in drag chain 16, in turn increasing the torque on headshaft 21 thereby increasing the tension in endless chain 36. The increase in torque on headshaft 21 as indicated by an increase in the tension in endless chain 36 indicates that the rate ash is being generated has increased and therefore the speed of drag chain 16 should be increased. Since the tension in endless chain 36 as monitored by load cell 40 is greater than the tension set point representing design torque on the headshaft 21, an error is generated by summer 42. Controller 52 operates on the error generated by summer 42 and increases the desired drag chain 16 speed signal. Voltage controller 54 increases the voltage controlled signal which increases the speed of variable speed drive 32 and in turn increases the speed of drag chain 16. As the speed of drag chain 16 increases, the amount of ash between two flights 18 decreases approaching the design value of 65% full as the torque on headshaft 21 approaches design torque and the speed of drag chain 16 is matched to the rate at which bottom ash is generated.

A similar but opposite sequence of events occurs when the rate at which bottom ash is generated decreases. When the rate at which bottom ash is generated decreases, the filled area between two flights 18 decreases below the 65% full design value causing a decrease in the tension of drag chain 16 and in turn a decrease in the torque in headshaft 21 thereby decreasing the tension in endless roller chain 36. The decrease in endless roller chain 36 tension as monitored by load cell 40 indicates that the filled area between two flights 18 is less than the design value resulting in less than design torque on headshaft 21. Therefore, the speed of drag chain 16 is decreased to allow more ash to accumulate between flights 18. The filled area increases approaching the design value of 65% full, the torque on headshaft 21 increases to design torque and the speed of drag chain 16 is matched to the rate at which ash is generated.

The control system adjusts the speed of variable speed drive 32 to minimize the speed of drag chain 16 commensurate with the rate at which bottom ash is produced. The control system thereby reduces power consumption when compared to the manually set speed control system. The automatic speed control system also permits minimized speed operation while maintaining ash removal capability thereby minimizing component wear and concomitantly extending the life of drag chain 16, flights 18 and submerged scraper conveyor 10 wear plates.

What is claimed is:

1. In a submerged scraper conveyor having a drag chain for removing material from a water impounded hopper, the drag chain having a plurality of flights mounted thereon, apparatus for controlling the speed of the submerged scraper conveyor, comprising:
   a. a variable speed drive means;
   b. a first sprocket operatively connected to the variable speed drive means;
   c. a headshaft for driving the drag chain;
   d. a second sprocket operatively connected to the headshaft;
   e. an endless chain passing around the first and second sprockets;
   f. a transducer for measuring the tension in the endless chain and for generating a signal proportional to the tension;
   g. control means for receiving the signal generated by the transducer and for generating a desired drag chain speed signal therefrom; and
   h. means for applying the desired drag chain speed signal generated by the control means to the variable speed drive means to vary the speed of the variable speed drive means as a function of the tension in the endless chain.

2. Apparatus for controlling the speed of a submerged scraper conveyor drag chain as described in claim 1 further comprising means for limiting the drag chain speed to a predetermined maximum.

3. Apparatus for controlling the speed of a submerged scraper conveyor drag chain as described in claim 1 further comprising means for limiting the drag chain speed to a predetermined minimum.

4. Apparatus for controlling the speed of a submerged scraper conveyor drag chain as described in claim 1 further comprising:
   a. means for comparing the tension signal generated by the transducer to a predetermined upper tension set point, the comparing means having a first input port for receiving the measured tension signal generated by the transducer, a second input port for receiving the predetermined upper tension set point and an output port at which the compared upper tension signal is presented; and
   b. means responsive to the compared upper tension signal for energizing an alarm upon detecting the measured tension signal exceeds the predetermined upper tension set point.

5. Apparatus for controlling the speed of a submerged scraper conveyor drag chain as described in claim 1 further comprising:
   a. means for comparing the tension signal generated by the transducer to a predetermined lower tension set point, the comparing means having a first input port for receiving the measured tension signal generated by the transducer, a second input port for receiving the predetermined lower tension set point and an output port at which the compared lower tension signal is presented; and
   b. means responsive to the compared lower tension signal for energizing an alarm upon detecting the measured tension signal is less than the predetermined lower tension set point.

6. Apparatus for controlling the speed of a submerged scraper conveyor drag chain as described in claim 1 wherein the control means is a proportional plus integral controller.

7. Apparatus for controlling the speed of a submerged scraper conveyor drag chain as described in claim 1 wherein the transducer provides an electrical signal.

8. Apparatus for controlling the speed of a submerged scraper conveyor drag chain as described in claim 1 wherein the variable speed drive means is a variable speed electric motor.

9. A method of controlling the speed of a submerged scraper conveyor having a drag chain driven by a headshaft, the headshaft in turn is driven directly or indirectly by a variable speed drive, the method of controlling the speed of the drag chain comprising:
   a. sensing the torque on the headshaft;
   b. generating a desired drag chain speed control signal as a function of the sensed torque until a predetermined maximum drag chain speed limit is reached;
   c. varying the speed of the drag chain as a function of the desired drag chain speed control signal for the duration of the desired drag chain speed control signal not exceeding that corresponding to the predetermined maximum drag chain speed; and
   d. maintaining the drag chain speed at the predetermined maximum drag chain speed limit for the duration of the desired drag chain speed control signal exceeding that corresponding to the predetermined maximum drag chain speed.

10. A method of controlling the speed of a submerged scraper conveyor having a drag chain driven by a headshaft, the headshaft in turn is driven directly or indirectly by a variable speed drive, the method of controlling the speed of the drag chain comprising:
   a. sensing the torque on the headshaft;
   b. generating a drag chain speed control signal as a function of the sensed torque until a predetermined minimum drag chain speed limit is reached;
   c. varying the speed of the drag chain as a function of the desired drag chain speed control signal for the duration of the desired drag chain speed control signal being not less than that corresponding to the predetermined minimum drag chain speed; and
   d. maintaining the drag chain speed at the predetermined minimum drag chain speed limit for the duration of the desired drag chain speed control signal being less than that corresponding to the predetermined minimum drag chain speed.

* * * * *